United States Patent
Ludlow

(10) Patent No.: US 10,427,197 B2
(45) Date of Patent: Oct. 1, 2019

(54) METHOD AND APPARATUS FOR FORMING AN ANNULAR PART

(71) Applicant: ROHR, INC., Chula Vista, CA (US)

(72) Inventor: Michael Ludlow, Belfast (GB)

(73) Assignee: ROHR, INC, Chula Vista, CA (US)

( * ) Notice: Subject to any disclaimer, the term of this patent is extended or adjusted under 35 U.S.C. 154(b) by 587 days.

(21) Appl. No.: 14/903,862

(22) PCT Filed: Jul. 8, 2014

(86) PCT No.: PCT/EP2014/064644
§ 371 (c)(1),
(2) Date: Jan. 8, 2016

(87) PCT Pub. No.: WO2015/004152
PCT Pub. Date: Jan. 15, 2015

(65) Prior Publication Data
US 2016/0158820 A1 Jun. 9, 2016

(30) Foreign Application Priority Data

Jul. 8, 2013 (GB) .................................. 1312228.8

(51) Int. Cl.
B21D 25/00 (2006.01)
B21D 7/00 (2006.01)
(Continued)

(52) U.S. Cl.
CPC ................ B21D 7/00 (2013.01); B21D 11/02 (2013.01); B21D 25/00 (2013.01); B21D 53/92 (2013.01)

(58) Field of Classification Search
CPC ...... B21D 5/01; B21D 5/04; B21D 25/00–04; B21D 19/12; B21D 22/02; B21D 11/02; B21D 7/00
See application file for complete search history.

(56) References Cited

U.S. PATENT DOCUMENTS

| | | | |
|---|---|---|---|
| 5,053,513 A | 10/1991 | Lee et al. | |
| 7,334,447 B1 * | 2/2008 | Kulkarni | B21D 22/24 72/334 |

(Continued)

FOREIGN PATENT DOCUMENTS

| | | | |
|---|---|---|---|
| CN | 102149489 A | 8/2011 | |
| DE | 102007050580 A1 * | 4/2009 | B21D 22/22 |

(Continued)

OTHER PUBLICATIONS

EPO Machine Translation of DE-102007050580-A1 (Year: 2019).*
(Continued)

*Primary Examiner* — Pradeep C Battula
(74) *Attorney, Agent, or Firm* — Snell & Wilmer, L.L.P.

(57) ABSTRACT

An apparatus (31) for forming an annular part (53) includes a punch (2) having a forming end with an external surface (32) shaped to correspond to the shape of the annular part (53). The apparatus further includes a clamping arrangement (3, 5) for clamping a large diameter end of a preform (4) and a gripping arrangement (6, 7) for adjustably gripping a small diameter end of the preform (4). An actuation system is provided for facilitating relative coaxial movement only between the punch (2), the clamping arrangement (3, 5) and the gripping arrangement (6, 7).

19 Claims, 5 Drawing Sheets

(51) Int. Cl.
*B21D 11/02* (2006.01)
*B21D 53/92* (2006.01)

(56) References Cited

U.S. PATENT DOCUMENTS

| | | | | |
|---|---|---|---|---|
| 9,021,848 B2* | 5/2015 | Leacock | ............... | B21D 25/02 72/296 |
| 2002/0062675 A1 | 5/2002 | Naaktgeboren | | |
| 2006/0086774 A1* | 4/2006 | Sanders | ............... | B21D 26/055 228/112.1 |
| 2007/0240470 A1* | 10/2007 | Suzuki | ............... | B21D 22/20 72/14.9 |
| 2009/0071108 A1* | 3/2009 | Nelson | ............... | B21D 22/206 53/453 |

FOREIGN PATENT DOCUMENTS

| | | |
|---|---|---|
| JP | 2002282953 A | 10/2002 |
| SU | 501811 | 2/1976 |
| SU | 848125 | 7/1981 |
| SU | 854516 | 8/1981 |
| SU | 1127673 | 12/1984 |
| WO | 2010003538 | 1/2010 |
| WO | 2012116999 | 9/2012 |
| WO | WO2012116999 A1 | 9/2012 |

OTHER PUBLICATIONS

Communication Pursuant to Article 94(3) dated Oct. 24, 2017 in EP Application No. 14747854.9.
Notification of the First Office Action dated Jan. 16, 2017 in Chinese Application No. 201480049246.6.
Notification of the Second Office Action dated Nov. 16, 2017 in Chinese Application No. 201480049246.6.
International Search Report dated Oct. 13, 2014.
International Preliminary Report on Patentability dated Jan. 12, 2016.
Written Opinion of the International Searching Authority dated Jan. 15, 2015.
The State Intellectual Property Office of the People's Republic of China, Chinese Office Action dated May 31, 2018 in Application No. 201480049246.6.
National Intellectual Property Administration, P. R. China, Fourth Chinese Office Action dated Dec. 3, 2018 in Application No. 201480049246.6.
Federal Institute of Industrial Property, Russian Office Action dated Jun. 29, 2018 in Application No. 2016103903/02(006174).
Federal Institute of Industrial Property, Search Report dated Jun. 1, 2018 in Application No. 2016103903/02(006174).
Federal Service for Intellectual Property, Russian Office Action dated Feb. 27, 2019 in Application No. 2016103903.
National Intellectual Property Administration, P. R. China, Chinese Decision on Rejection dated May 17, 2019 in Application No. 201480049246.6.

* cited by examiner

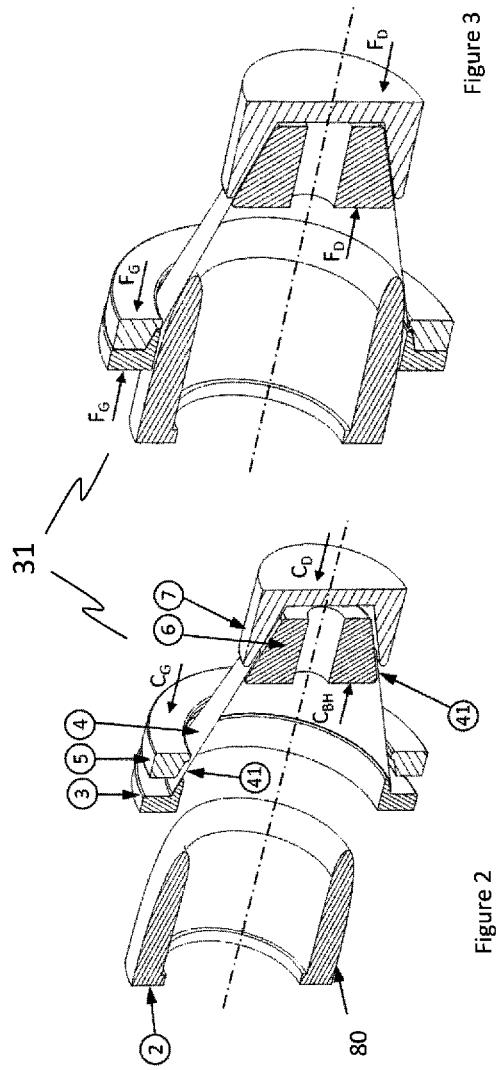
Figure 2
Figure 3
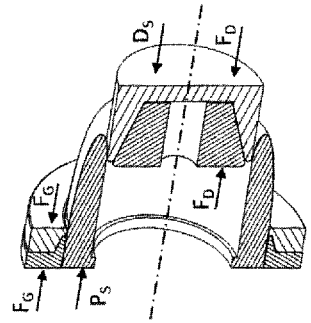
Figure 4
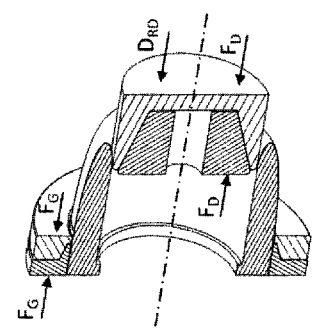
Figure 5
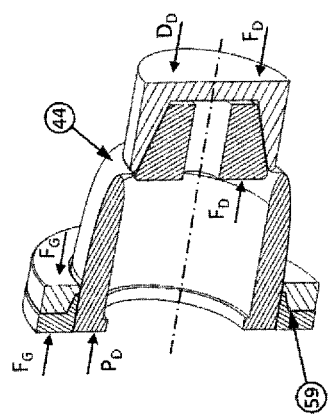
Figure 6

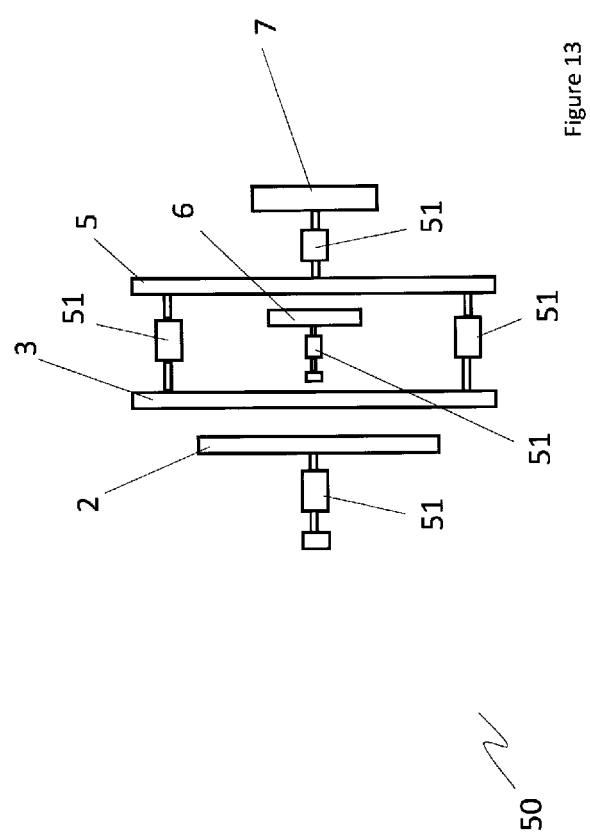

METHOD AND APPARATUS FOR FORMING AN ANNULAR PART

CROSS-REFERENCE TO RELATED APPLICATION

The instant application is a national phase of PCT International Application No. PCT/EP2014/064644 filed Jul. 8, 2014, and claims priority to GB Patent Application Serial No. 1312228.8 filed Jul. 8, 2013, the entire specifications of both of which are expressly incorporated herein by reference.

This invention relates to a method and apparatus for forming an annular part. A lip skin is the mechanical component surrounding the inlet opening of an aircraft nacelle. The nacelle generally has a thin, aerodynamically shaped metal skin covering the jet engine of the aircraft. The lip skin is generally comprised of a single piece or multiple sectors and the main features of the lip skin are a smooth outer trailing edge which must be free from irregularities and discontinuities to reduce drag and to avoid the creation of turbulence. An inner inlet edge which guides the flow of air into the engine, and a leading edge or lip, which provides a smooth transition between the outer trailing edge and the inner inlet edge.

The complex three dimensional compound curvature shape of the lip skin coupled with material selection typically requires a complex multi-stage forming process, often requiring intermediate heat treatments. Typically lip skins are produced by multiple stage deep drawings or spin forming processes, requiring complex and costly tooling. Due to aerodynamic considerations, it is desirable to extend the outer trailing edge of the lip skin, known as extended trailing edges wherein the axial length of the outer trailing edge of the lip skin is greater than axial length of the inner inlet edge. Known deep drawing processes are unsuitable for the manufacture of such extended trailing edges.

The objective of the present invention is to provide a method and apparatus for forming an annular part with an extended outer portion to increase the extent of laminar flow over the outer surface of the nacelle and thus remove any flow interruptions.

Accordingly, the present invention provides an apparatus for forming an annular part comprising a punch having a forming end with an external surface shaped to correspond to the shape of the annular part, a clamping means for clamping a large diameter end of a preform and a gripping means for adjustably gripping a small diameter end of the preform and actuation means for facilitating relative coaxial movement only between the punch, the clamping means and the gripping means.

While composite materials can be used for many parts of the annular part, the annular part must generally be made from a metal, such as aluminum, titanium, or stainless steel. Where the annular part is a lip skin these materials are useful to be able to withstand impacts upon the leading edge or lip thereof. The titanium is also useful in view of recently legislated stringent de-icing requirements requiring higher temperatures at the nacelle leading edge.

Ideally, the preform is a metal blank.
Preferably, the preform is a metal alloy blank.
Preferably, the preform is a conical blank.
Preferably, the preform is a frusto-conical blank.
Ideally, the preform is symmetrical.
Preferably, the preform is asymmetrical.
Ideally, the preform is formed into an annular part in a single forming process.

Preferably, the forming end of the punch has an annular shape.

Ideally, the actuation means is capable of creating coaxial movement of the apparatus along a centerline/carriage. The centerline/carriage forms a datum for all apparatus components location and kinematics.

Preferably, the punch has an external surface shaped to provide the internal surface of the annular part.

Ideally, the annular part is a lip skin.

Ideally, the external surface of the punch is optimized for springback.

Preferably, the external surface of the punch and/or die has a high surface finish. Advantageously, the high surface finish reduces friction during forming.

Ideally, the high surface finish of the external surface of the punch and/or die is achieved by polishing.

Additionally, a friction reducing lubricant is applied during the forming process.

Ideally, the actuation means is a linear actuation system. A hydraulic or electromechanical linear actuation system is coupled to the punch, clamping means, and gripping means so as to cause relative co-axial movement of these along the centerline.

Preferably, the punch is mechanically coupled to the linear actuation system.

Ideally, the clamping means comprises two separable aft and forward clamp assembly members.

Ideally, the aft and forward clamp assembly members are annular clamp members.

Preferably, the aft and forward clamp assembly members are openable and closable to clamp the preform. The motion of both aft and forward clamp assembly members is aligned with the centerline.

Preferably, the preform comprises a single sheet or several sheets with a minimum of one joint.

Ideally, the joint is achieved using the friction stir welding process although linear friction and other welding techniques which maintain formability can also be used to form the preform.

Alternatively, the preform is formed by extruding, spinning, casting, pressing, or any suitable manufacturing process for forming a conical or frusto-conical preform.

Preferably, the preform is a one piece preform.

Advantageously, no welds are required in the homogeneous one piece preform.

Ideally, the preform is a conical or frusto-conical one piece preform.

Ideally, the gripping means comprises a preform holder formed for operable engagement with a die.

Ideally, the preform holder is conical or frusto-conical.
Ideally the die is conical or frusto-conical.
Preferably, the preform holder is symmetrical.
Ideally, the preform holder is asymmetrical.

Preferably, the preform holder and the die are designed to control the flow of the preform. Advantageously, the interaction of the preform holder and the die provides a draw/redraw action relative to the axial motion of the punch.

Preferably, the apparatus has control means for controlling the pressure applied between the surface of at least a portion of the apparatus and the preform.

Ideally, the pressure between the surface of at least a portion of the apparatus and the preform is predetermined or is adjustable throughout the forming process.

Ideally, the external surface of the punch is designed to match the outlet surface of the annular part with allowance for springback where required.

Preferably, the punch internal surface is designed to match the inlet surface of the annular part with allowance for springback where required.

Ideally, the internal surface of the aft clamp assembly member is designed to match a portion of the external surface of the punch with a slight clearance.

Preferably, the aft clamp assembly member has a grip face and the surface of the grip face is preferably conical. The geometry of the grip face can vary depending on the severity of asymmetry in the punch.

Ideally, the forward clamp assembly member has a grip face designed to match the external surface of the preform.

Preferably, the surface of the aft clamp assembly member grip face is designed to match the surface of the preform and the surface of the forward clamp assembly member grip face.

Ideally, the geometry of the aft clamp assembly member grip face and the forward clamp assembly member grip face is designed to provide grip while minimizing any chance of fracture in the preform during forming.

Preferably, the aft clamp assembly member has a grip face fillet radius.

Ideally, the grip face fillet radius forms part of a lock bead assembly in conjunction with forward clamp assembly member.

Preferably, the fillet radius is optimized for the material used to provide grip while minimizing the chance of slippage and component failure.

Ideally, the forward clamp assembly member has a grip face fillet radius.

Preferably, the radius of the grip face fillet radius is designed to provide some small material flow. Advantageously, the flowability of the material minimizes the chance of failure of the preform and ensures the conformity of the preform to the shape of the external surface of the punch.

Ideally, the surface of the forward clamp assembly member grip face is normally conical.

Preferably, the surface of the forward clamp assembly member grip face can vary depending on the severity of asymmetry in the punch.

Ideally, the surface of the forward clamp assembly member grip face is designed to match the surface of the preform and the surface of the aft clamp assembly member grip face.

Ideally, the geometry on both grip faces is designed to provide grip while minimizing any chance of fracture in the preform during forming.

Preferably, the forward clamp assembly member has an internal surface to match the external surface of the punch with a slight clearance for the preform.

Ideally, the preform holder has an external surface which is generally conical or frusto-conical. Alternatively, the external surface of the preform holder is variable depending on the severity of asymmetry in the external surface of the punch and internal surface of the punch.

Ideally, the taper angle of the external surface of the preform holder is also designed to match the taper angle of the internal surface of the die.

Preferably, the die has an external draw face fillet radius.

Ideally, the external draw face fillet radius is optimized for controlling material flow during the redraw stage of the forming process.

Ideally, the geometry of the draw face fillet radius is based on material formability and/or gripping forces.

Preferably, the die has a smooth draw face.

Ideally, the die has an internal surface having a generally conical or frusto-conical shape. Alternatively, the internal surface of the die is variable depending on the severity of asymmetry in the external surface of the punch and the internal surface of the punch.

Ideally, the die has an external surface designed to match the internal surface of the punch with a slight clearance for the preform. The preform has a joint/joints for individual sheets. The joint/joints will normally be achieved using the friction stir welding process although other processes outlined above can also be used.

Ideally, the preform is cold formed.

Alternatively, the preform is heated or most preferably pre-heated.

Ideally, at least a portion of the apparatus for forming an annular part has a means for heating a preform in operable engagement therewith.

Alternatively, the forming process occurs in a heated environment wherein the apparatus and preform are locatable within the heated environment.

Advantageously, the heating means is utilized should the material of the preform require heat in order to facilitate satisfactory forming thereof.

Accordingly, the present invention provides a method of forming an annular part comprising the steps of forming a conical or frusto-conical preform with at least one open end, initiating an actuation means to cause relative coaxial movement only between a punch, a clamping means and a gripping means thereby clamping a large diameter end of the preform in the clamping means and gripping a second small diameter end of the preform in the gripping means and inserting the punch in an axial direction into the large diameter open end of the preform until the external surface of the punch engages the internal surface of the preform, causing relative co-axial movement between the gripping means and the punch so that the portion of the wall of the preform between the punch and the gripping means is formed over the leading edge of the punch.

Advantageously, the described methodology will not only allow the improved manufacture of current nacelle lip skin designs but will also accommodate the manufacture of one piece extended trailing edge lip skins which require a longer trailing edge which is an area of specific interest within the aerospace industry.

Preferably, the forming end of the punch is moved proximal to the gripping means prior to the portion of the wall being formed therebetween.

Advantageously, prior movement of the forming end of the punch prevents wrinkling or buckling of the portion of the wall formed over the leading edge of the punch.

Ideally, the method comprising locating the large diameter end hereinafter referred to as the aft end of the preform with an internal surface of the aft end of the preform resting against the grip face of the aft clamp assembly member.

Preferably, the method comprising locating the end of the preform with the small diameter hereinafter referred to as the forward end with an internal surface of the forward end of the preform resting against the external surface of the preform holder.

Ideally, the method comprising moving the preform holder into position within the preform.

Ideally, the method comprising moving one or both of the forward clamp assembly member and the aft clamp assembly member axially towards one another along the centre line by a linear actuation force for clamping the preform there between.

Ideally, the method comprising moving one or both of the preform holder and the die axially towards one another along the centre line by a linear actuation force for clamping the preform there between.

Preferably, the method comprising applying an axial force between the aft clamp assembly member and forward clamp assembly member.

Ideally, the method comprising applying a set axial force between the aft clamp assembly member and forward clamp assembly member to maintain a strong clamping action through the process.

Ideally, the method comprising applying a variable axial force between the preform holder and the die. Advantageously, the axial force can be varied in a controlled manner throughout the forming process.

Preferably, the method comprising a draw stage in the forming process by maintaining the axial force between aft clamp assembly member and forward clamp assembly member constant and adjusting the axial force between the preform holder and the die as required whilst displacing the punch and/or die holder axially along the centerline.

Ideally, the draw stage of the method being further optimizeable by adjusting the clamping force of the aft clamping assembly member.

Preferably, the draw stage of the method being further optimizeable by adapting the taper angle of the preform and/or die and/or preform holder.

Ideally, the method comprising a redraw stage of the forming process by maintaining the axial force between aft clamp assembly member and forward clamp assembly member constant and adjusting the axial force between the preform holder and the die as required and moving the preform holder and die during the redraw stage of the process by another axial force.

Advantageously, a portion of the preform held between the preform holder and the die, and extending around the entire circumference of the preform, is forced towards the clamping arrangement and around the entire circumference of the punch.

Preferably, the method comprising a stretch stage of the forming process comprising maintaining the axial force between aft clamp assembly member and forward clamp assembly member constant and adjusting the axial force between the preform holder and the die as required to clamp the preform, displacing the punch by another axial force while the preform holder and the die are displaced during this process by an axial force opposed to the axial force displacing the punch to stretch the formed preform to minimize springback.

Ideally, the method comprising applying a counter grip force against die draw face to fully clamp the material of the formed preform for the stretching process.

Ideally, the stretch is achieved by moving the preform holder and die along with the aft clamp assembly member and forward clamp assembly member while holding the punch stationary, or any combination of these.

Ideally the method comprising removing the formed annular part from the forming apparatus by axially unloading and axially moving the forward clamp assembly member and the die, withdrawing the punch and the preform holder and removing the formed annular part from the aft clamp assembly member. The part of the preform clamped between the preform holder and die during forming is cut away. Similarly, the part of the preform held between the forward and aft clamp assembly members during forming is cut away.

Ideally, following welding of the preform, an annealing process is carried out.

Ideally, the method is a cold forming method.

Alternatively, the method comprises heating of the preform.

Ideally, the method comprises heating at least a portion of the apparatus for forming an annular part.

Preferably, the method comprises placing the apparatus for forming an annular part and the preform in a heated environment prior to and/or during the forming process.

Advantageously, the heating is beneficial should the material of the preform require heat in order to facilitate satisfactory forming thereof.

The invention will now be described with reference to the accompanying drawings, which show by way of example only one embodiment of an apparatus and method for forming an annular part such as a lip skin for a nacelle. In the drawings:—

FIG. 2 is a second sectional perspective view of apparatus for forming an annular part in a first stage of the forming process;

FIG. 3 is a third sectional perspective view of apparatus for forming an annular part in a second stage of the forming process;

FIG. 4 is a fourth sectional perspective view of apparatus for forming an annular part in a third stage of the forming process;

FIG. 5 is a fifth sectional perspective view of apparatus for forming an annular part in a fourth stage of the forming process;

FIG. 6 is a sixth sectional perspective view of apparatus for an annular part in a fifth stage of the forming process;

FIG. 13 is a schematic view of an actuation system for effecting movement of the apparatus for forming an annular part.

Figure 1:
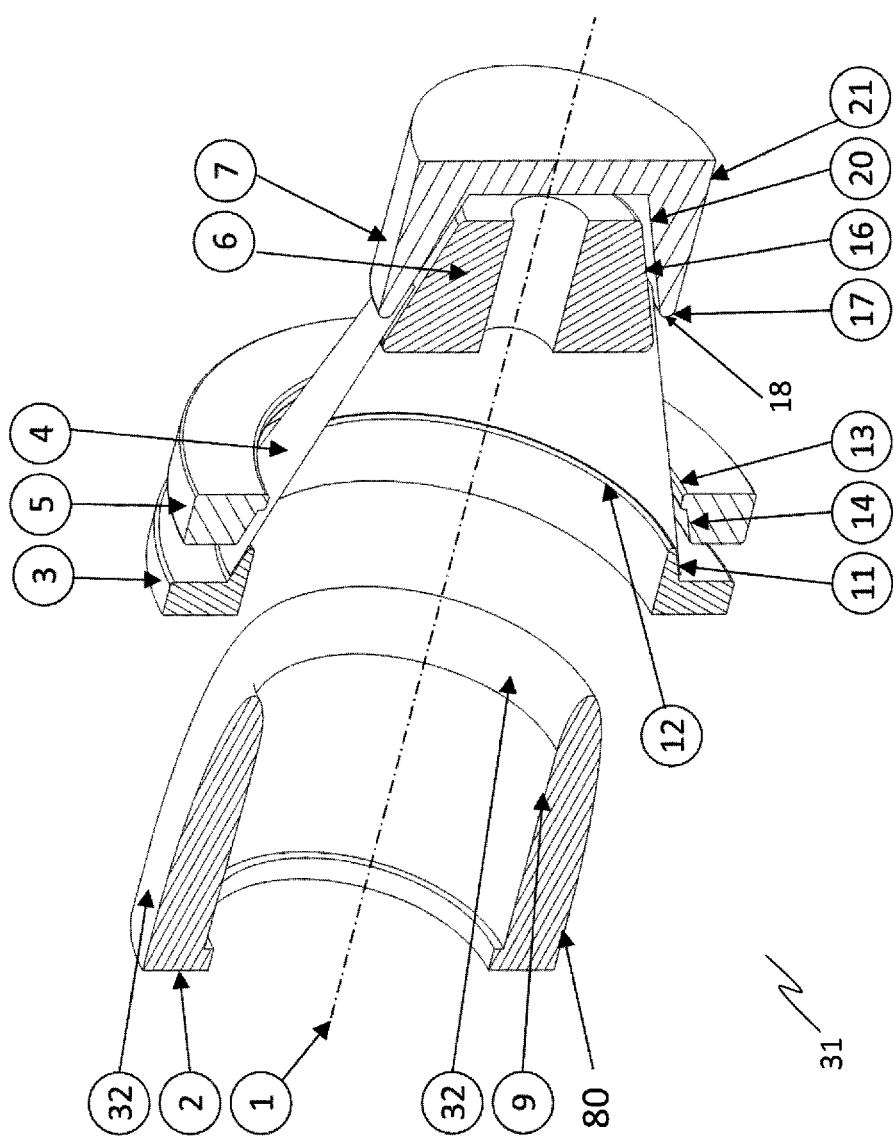
FIG. 1 is a sectional perspective view of an apparatus for forming an annular part.
Figure 7:
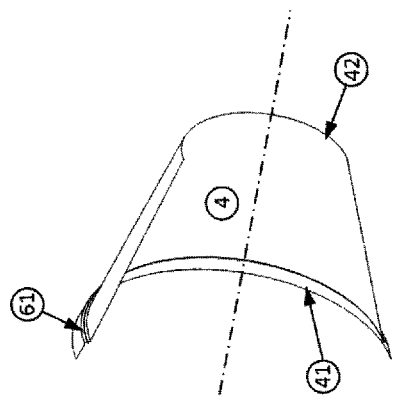
FIG. 7 is a sectional view of the frusto-conical preform at the first stage of the forming process.
Figure 8:
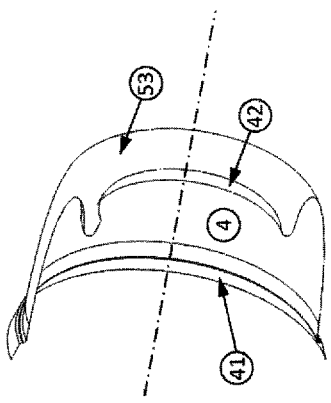
FIG. 8 is a sectional view of the frusto-conical preform at the second stage of the forming process.

Referring to the drawings and initially to FIG. 1 there is shown an apparatus indicated generally by the reference numeral 31 for forming a one piece lip skin for the leading edge of a nacelle. The operation of the apparatus 31 is based along a centerline/carriage 1 which forms the datum for all apparatus components location and kinematics. The apparatus 31 has a punch 2 which has an external surface 32 shaped to provide the internal surface of the finished formed lip skin, see especially FIG. 10. The external surface 32 is optimized to eliminate or reduce springback and is of a high surface finish to reduce friction during forming. The high surface finish being achieved by polishing of the external surface 32 and the friction being further reduced via the application of lubricant during the forming process. A final stretch process minimizes springback but some reprofiling of the tool surface 32 to compensate for shape change can be made. The punch 2 is fixed to a linear actuation system 50 (see FIG. 13) such as a hydraulic or electromechanical system aligned with the centerline 1 which causes axial movement of the punch along the centerline. The linear actuation system 50 comprises actuation members 51 in connection with each of the punch 2, clamping assembly members 3, 5, the preform holder 6, and the conic die 7.

Operation of one or more of the actuation members 51 permit relative linear motion between any two or more components of the apparatus 31 and also permit synced motion of any two or more components of the apparatus 31.

A clamp assembly 3, 5 comprises two separable aft and forward clamp assembly members 3, 5 respectively in the form of two annular clamp members and the clamp assembly 3, 5 is used to grip a frusto-conical preform 4 where the motion of both aft clamp assembly member 3 and forward clamp assembly member 5 is axially aligned with the centerline 1.

Figure 12:
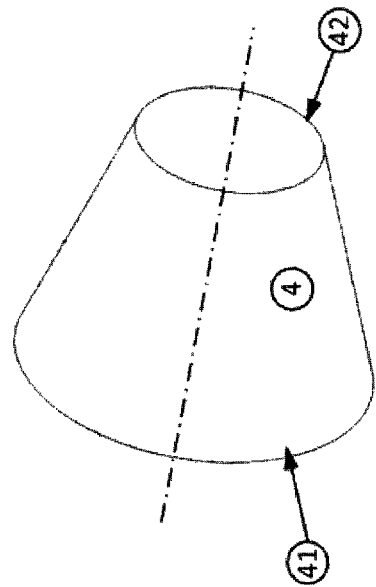
FIG. 12 is perspective view of a one piece preform having no joints.
Figure 11:
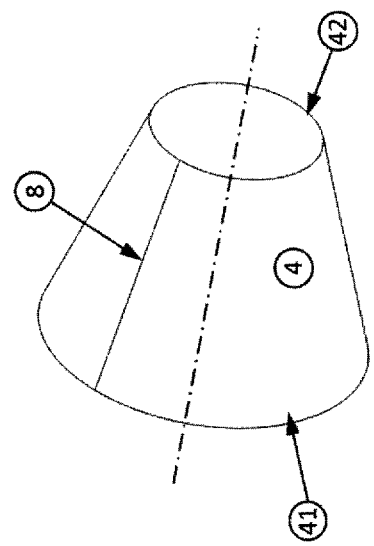
FIG. 11 is a perspective view of a frusto-conical preform made from a sheet of metal.

The frusto-conical preform 4 is produced from a single sheet 33 with a single seam weld, or several sheets with multiple welded joints 8, see FIG. 11. The joint 8 is normally achieved using the friction stir welding process although linear friction and other high formability high quality welding processes can also be used to form the frusto-conical preform 4. Following welding of the frusto-conical preform 4, an annealing process is carried out. In an alternative embodiment as shown in FIG. 12, the frusto-conical preform 4 is a one piece preform produced by extruding, spinning, casting, or otherwise forming a homogeneous one piece preform 4 having no joints/welds.

A conic preform holder 6 is designed to control the flow of the frusto-conical preform 4 by mating with a conic die 7 and also to provide a draw/redraw action relative to the axial motion of the punch 2 which is aligned with the centre line 1. The apparatus 31 has a control system integrally formed with the actuation system for controlling the pressure between the apparatus 31 or parts thereof and the frusto-conical preform 4.

The external surface 80 of the punch 2 is designed to match the surface geometry of the annular part 53, both external surface 80 and internal surface 9 is designed to match the IML (Inner Mold Line) of the lip skin 53 with allowance for spring back compensation if required.

The aft clamp assembly member 3 has a grip face 11 and the surface of the grip face 11 will normally be conical, but can vary depending on the severity of asymmetry in the punch 2.

The surface of the grip face 11 is designed to match the internal surface of the frusto-conical preform 4 and a grip face 14 of the forward clamp assembly member 5. The geometry of the grip face 11 is designed to provide grip while minimizing any chance of fracture in the frusto-conical preform 4 during forming. The aft clamp assembly member 3 has a grip face fillet radius 12 and the fillet radius 12 forms part of a lock bead assembly in conjunction with forward clamp assembly member 5. The fillet radius is optimized for the material used to provide grip while minimizing the chance of slippage and component failure. The forward clamp assembly member 5 has a grip face fillet radius 13 and the radius of the fillet radius 13 is designed to provide some small material flow while minimizing the chance of failure and ensuring the conformity of the frusto-conical preform 4 to the external surface 80 of the punch 2.

The forward clamp assembly member 5 has grip face 14 and the profile of the grip face 14 will normally be conical, but can vary depending on the severity of asymmetry in the punch 2. The surface of the grip face 14 is designed to match the frusto-conical preform 4 and the grip face 11 of the aft clamp assembly member. The geometry of the grip face 14 is designed to provide grip while minimizing any chance of fracture in the frusto conical preform 4 during forming.

The gripping assembly 6, 7, has a preform holder 6 and a die 7. The conic preform holder 6 has an external surface 16 which is normally a conic section, however the profile can change depending on the severity of asymmetry in the external surface 80 of the punch 2 and internal surface 9 of the punch 2. The conic die 7 has a fillet radius 17 which is optimized to control material flow during the redraw stage see FIG. 5. The radius 17 is adjustable to improve the forming process. The conic die 7 has an internal surface 20 which is normally a conic section, however the internal surface 20 can change depending on the severity of asymmetry in the external surface 80 of the punch 2 and the internal surface 9 of the punch 2.

The taper of the internal surface 20 of the conic die 7 is designed to match the external surface 16 of the conic preform holder 6. The conic die 7 has an external surface 21 which is designed to match the internal surface 9 of the punch 2 with a slight clearance for the frusto-conical preform 4. The frusto-conical preform 4 has a joint 8 for individual sheets. The joint 8 will normally be achieved using the friction stir welding process although other processes outlined above can also be used.

In use, and referring to FIGS. 2 to 10, there is shown a first stage of the forming process where the frusto-conical preform 4 is inserted into the forming apparatus 31. The end 41 of the frusto-conical preform 4 with the large diameter hereinafter referred to as the aft end 41 is located with an internal surface of the aft end of the frusto-conical preform 4 resting against the grip face 11 of the aft clamp assembly member 3. The end 42 of the frusto-conical preform 4 with the small diameter hereinafter referred to as the forward end 42 is located with an internal surface of the forward end 42 of the frusto-conical preform 4 resting against the external surface 16 of conic preform holder 6. In use, the conic preform holder 6 is axially moved into position within the frusto-conical preform 4 as the apparatus 31 is set up to perform the lip skin forming operation. With the frusto-conical preform 4 correctly positioned on the aft clamp assembly member 3 and the conic preform holder 6, the forward clamp assembly member 5 and the conic die 7 are axially closed along centre line 1 by linear actuation forces CG and CD towards the aft clamp assembly member 3 and the conic preform holder 6 respectively. The conic preform holder 6 may also require to be displaced by linear actuation force CBH. The frusto-conical preform 4 is now firmly gripped between forward and aft clamp assembly members 5 and 3 respectively and between conic preform holder 6 and conic die 7. The aft end 41 of the frusto conical preform 4 is shaped by clamping of the metal between the male and female members of the lock bead assembly 59 see FIG. 4 into a stepped section 61 see FIGS. 8 to 10 to ensure the frusto-conical preform 4 is not easily released during the high force forming process.

Figure 9:
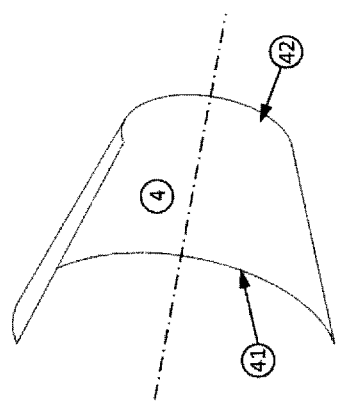
FIG. 9 is a sectional view of the partially formed preform at the third stage of the forming process.

Referring to the drawings and now to FIG. 3, a set axial force FG is applied between aft clamp assembly member 3 and forward clamp assembly member 5 to maintain a strong grip through the forming process. A separate axial force FD is applied between conic preform holder 6 and conic die 7. FD can be adjusted throughout the lip skin forming process. Referring now to FIG. 4, a draw stage of the forming process is illustrated. While maintaining FG and adjusting FD as required, the punch 2 is displaced axially along the centerline 1 in the direction of the taper of the conic die 7 by axial force PD. The conic preform holder 6 and the conic die 7 can also be axially displaced during this process by axial force DD to ease the degree of radial stretch during the draw stage. The clamping force of the aft clamping assembly members 3, 5, and/or the taper angle of the conic die 7, frusto-conical preform 4, and preform holder 6 and clamping assembly members 3, 5 are adjustable to optimize the draw stage and minimize the chance of wrinkling while avoiding over stretching the material causing a fracture. The part formed lip skin 4 shown in FIG. 9 illustrates the configuration of the preform at the draw stage of the forming process.

Referring to the drawings and now to FIG. 5, the redraw stage of the lip skin forming process is shown. While maintaining axial force FG and adjusting FD as required conic preform holder 6 and conic die 7 are displaced during the redraw stage of the process by DRD. Referring now to FIG. 6, the stretch stage of the lip skin forming process is shown. While maintaining FG and adjusting FD as required to clamp the frusto-conical preform 4, the punch 2 is displaced by PS while the conic preform holder 6 and the conic die 7 are displaced during this process by DS to stretch the formed lip skin 44. In addition, a counter grip may be required to force against conic die draw face 18 to fully clamp the material of the formed lip skin 44 for the stretching process.

Figure 10:
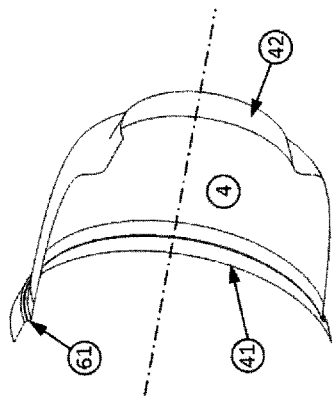
FIG. 10 is a sectional view of the formed preform at the fourth stage of the forming process.

When the above referred stages of the lip skin forming process are complete, the formed lip skin 44 as shown in FIG. 10 is removed from the forming apparatus 31. The forward clamp assembly member 5 and conic die 7 are unloaded and axially moved before the formed lip skin 44 is removed from the aft clamp assembly member 3 as the punch 2 and the conic preform holder 6 is withdrawn. The part of the lip skin 4 clamped between the preform holder 6 and the die 7 during forming is cut away as well as the stepped section 61 to leave the formed lip skin 53.

The forming process is a cold forming process or a process comprising heating of the frusto-conical preform 4. The frusto-conical preform 4 is heated by a heat source in contact therewith or in contact with a portion of the apparatus 31. Alternatively, the apparatus 31 including the frusto-conical preform 4 are placed in a heated environment prior to and/or during the forming process.

In relation to the detailed description of the different embodiments of the invention, it will be understood that one or more technical features of one embodiment can be used in combination with one or more technical features of any other embodiment where the transferred use of the one or more technical features would be immediately apparent to a person of ordinary skill in the art to carry out a similar function in a similar way on the other embodiment.

In the preceding discussion of the invention, unless stated to the contrary, the disclosure of alternative values for the upper or lower limit of the permitted range of a parameter, coupled with an indication that one of the said values is more highly preferred than the other, is to be construed as an implied statement that each intermediate value of said parameter, lying between the more preferred and the less preferred of said alternatives, is itself preferred to said less preferred value and also to each value lying between said less preferred value and said intermediate value.

The features disclosed in the foregoing description or the following drawings, expressed in their specific forms or in terms of a means for performing a disclosed function, or a method or a process of attaining the disclosed result, as appropriate, may separately, or in any combination of such features be utilised for realising the invention in diverse forms thereof as defined in the appended claims.

The invention claimed is:

1. An apparatus for forming an annular part, comprising:
 a punch having a forming end with an external surface shaped to correspond to the shape of the annular part;
 clamping means for clamping a large diameter end of a preform;
 gripping means for adjustably gripping a small diameter end of the preform; and
 actuation means for facilitating relative coaxial linear movement only between the punch, the clamping means and the gripping means parallel to a centerline or carriage;
  wherein the gripping means comprises a preform holder formed for operable engagement with a die, the preform holder has an external surface which is generally conical or frusto-conical, a taper angle of the external surface of the preform holder is configured to match a taper angle of the internal surface of the die and wherein the die has an internal surface having a generally conical or frusto-conical shape, the die having an external surface configured to match the internal surface of the punch with a slight clearance for the preform.

2. The apparatus as claimed in claim 1, wherein the apparatus is adapted for forming the preform into the annular part in a single forming process.

3. The apparatus as claimed in claim 1, wherein the actuation means is capable of creating coaxial movement of components of the apparatus along the centerline or carriage.

4. The apparatus as claimed in claim 3, wherein the actuation means is a hydraulic or electromechanical linear actuation system, wherein the linear actuation system is coupled to the punch, clamping means or gripping means so as to cause relative co-axial movement of one or more of these along the centerline or carriage.

5. The apparatus as claimed in claim 3, wherein the clamping means comprises separable aft and forward clamp assembly members, one or both of the aft and forward clamp assembly members being openable and closable to clamp the preform, the motion of one or both aft and forward clamp assembly members being aligned with the centerline or carriage.

6. The apparatus as claimed in claim 5, wherein the aft and forward clamp members are annular clamp members.

7. The apparatus as claimed in claim 6, wherein the surface of the aft clamp assembly member grip face is configured to match the surface of the forward clamp assembly member grip face.

8. The apparatus as claimed in claim 7, wherein the aft clamp assembly member has a first grip face fillet radius, the forward clamp assembly member has a second grip face fillet radius, and the first grip face fillet radius forms part of a lock bead assembly in conjunction with the forward clamp assembly member.

9. The apparatus as claimed in claim 5, wherein an internal surface of the aft clamp assembly member is configured to match a portion of the external surface of the punch with a slight clearance for the preform, the aft clamp assembly member having a grip face.

10. The apparatus as claimed in claim 1, wherein the punch has an external surface shaped to provide an internal surface of the annular part.

11. The apparatus as claimed in claim 10, wherein the external surface of the punch or die is optimized for springback, the external surface of the punch or die having a high surface finish.

12. The apparatus as claimed in claim 10, wherein the external surface of the punch is configured to match an outlet surface of the annular part with allowance for springback where required, a punch internal surface being configured to match the inlet surface of the annular part.

13. The apparatus as claimed in claim 1, wherein the preform holder or the die are conical or frusto-conical and of symmetrical or asymmetrical geometry.

14. The apparatus as claimed in claim 1, wherein the preform holder and the die are configured to control the flow of the preform in response to the preform holder interacting with the die, the interaction of the preform holder and the die providing a draw or redraw action relative to an axial motion of the punch.

15. The apparatus as claimed in claim 1, wherein the apparatus has control system for controlling the pressure applied between the surface or surfaces of at least a portion of the apparatus and the preform.

16. The apparatus as claimed in claim 1, wherein the die has an external draw face fillet radius.

17. The apparatus as claimed in claim 1, at least a portion of the apparatus having a heat source for heating the preform in operable engagement therewith or the apparatus and preform are locatable within a heated environment, the heat being utilized should the material of the preform require heat in order to facilitate satisfactory forming thereof.

18. The apparatus as claimed in claim 1, wherein the annular part is a lip skin.

19. An apparatus for forming an annular part, comprising:
   a punch having a forming end with an external surface shaped to correspond to the shape of the annular part;
   clamping means for clamping a large diameter end of a preform;
   gripping means for adjustably gripping a small diameter end of the preform; and
   actuation means for facilitating relative coaxial linear movement only between the punch, the clamping means and the gripping means parallel to a centerline or carriage;
      wherein the punch has an external surface shaped to provide an internal surface of the annular part,
      wherein the forward clamp assembly member has a grip face configured to match the external surface of the preform,
      wherein the surface of the aft clamp assembly member grip face is configured to match the surface of the preform and the surface of the forward clamp assembly member grip face, and
      wherein the aft clamp assembly member has a first grip face fillet radius, the forward clamp assembly member has a second grip face fillet radius, and the first grip face fillet radius forms part of a lock bead assembly in conjunction with the forward clamp assembly member.

\* \* \* \* \*